July 28, 1936.  F. BURDICK  2,048,835
FISHING REEL
Filed Aug. 31, 1935   2 Sheets-Sheet 1
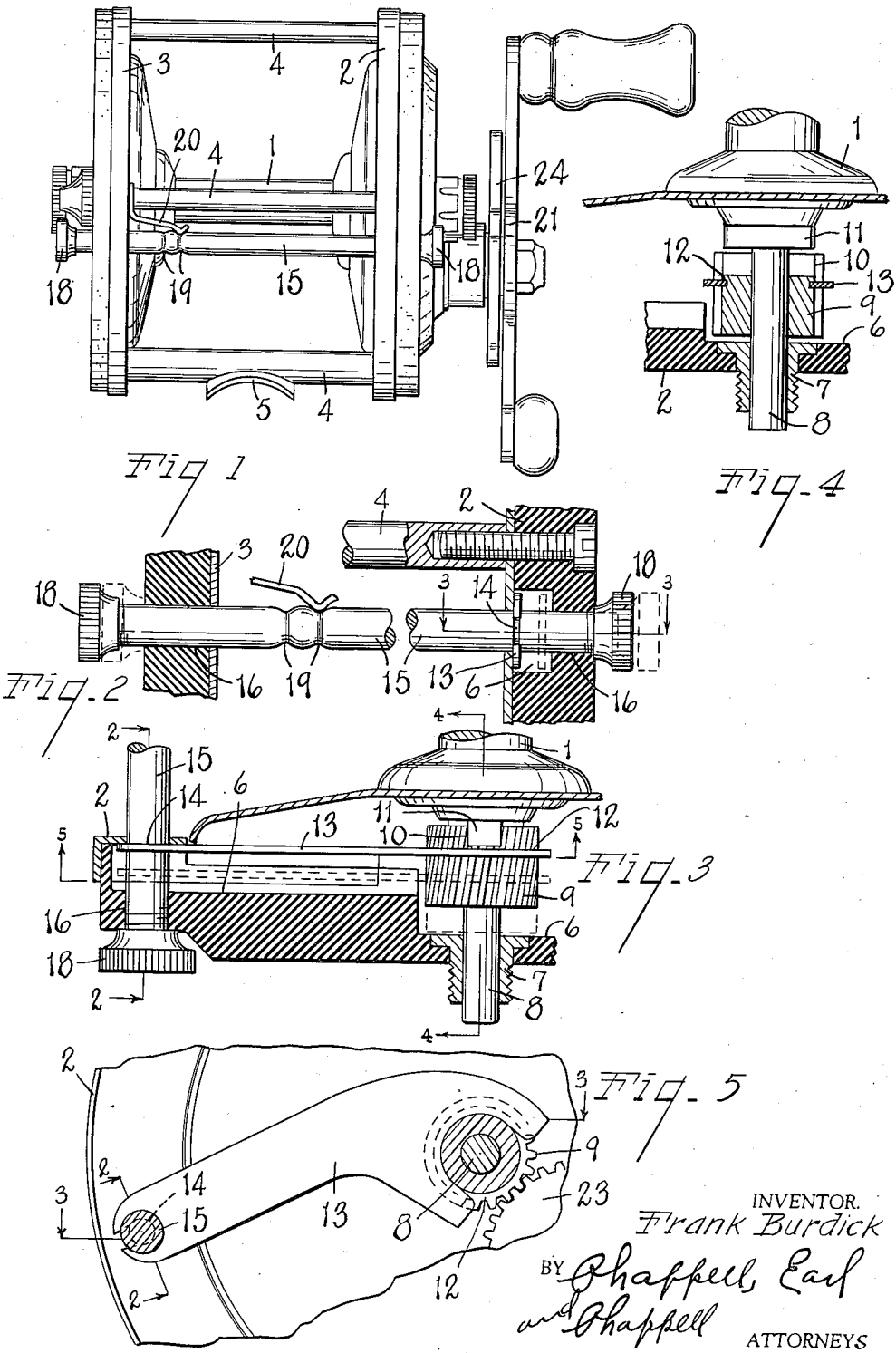
INVENTOR.
Frank Burdick
BY Chappell, Earl
and Chappell
ATTORNEYS

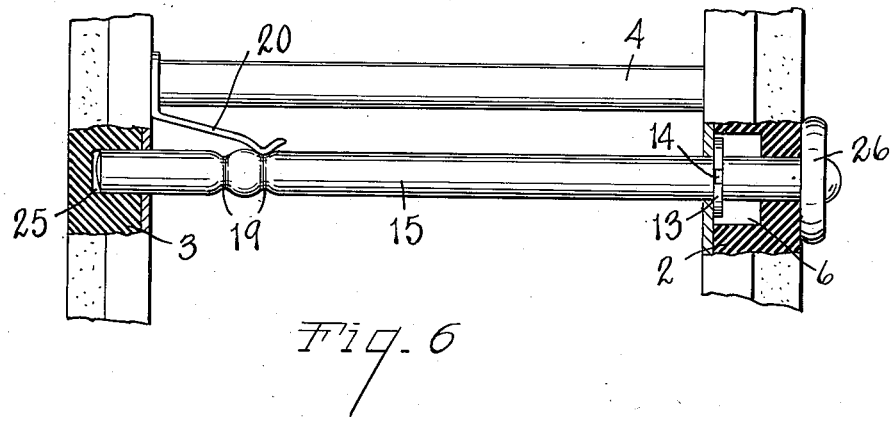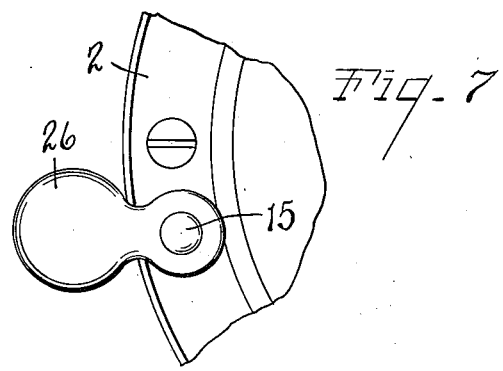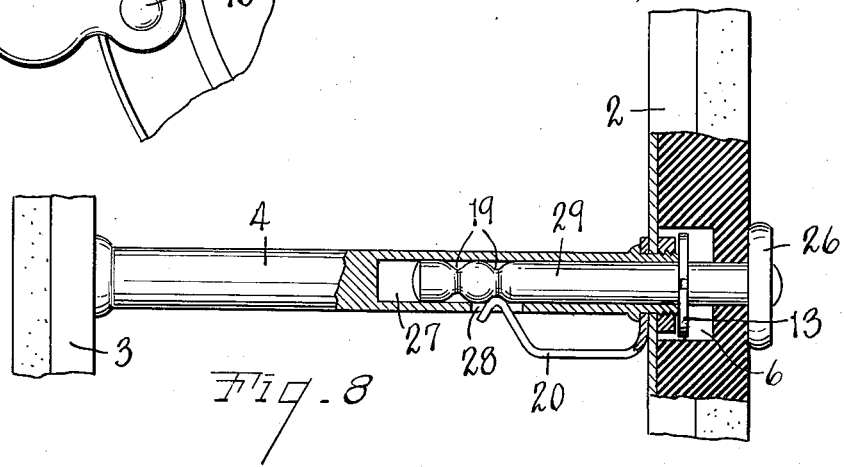

Patented July 28, 1936

2,048,835

UNITED STATES PATENT OFFICE 2,048,835

FISHING REEL

Frank Burdick, Kalamazoo, Mich., assignor to Shakespeare Company, Kalamazoo, Mich.

Application August 31, 1935, Serial No. 38,779

12 Claims. (Cl. 242—84.7)

This invention relates to improvements in fishing reels.

The main objects of this invention are:

First, to provide a control clutch mechanism for a free spool reel which is very convenient in use, is efficient in action, and compact and economical in construction.

Second, to provide a clutch control for a free spool fishing reel which minimizes the likelihood of stripping gears when the clutch is engaged and disengaged.

Objects relating to details and economies of my invention will appear from the description to follow. The invention is defined and pointed out in the claims.

Preferred embodiments of my invention are illustrated in the accompanying drawings, in which:

Fig. 1 is a front elevation of a fishing reel embodying my invention.

Fig. 2 is an enlarged fragmentary view partially in section on line 2—2 of Figs. 3 and 5.

Fig. 3 is a fragmentary view partially in section on line 3—3 of Fig. 2.

Fig. 4 is a fragmentary view partially in section on line 4—4 of Fig. 3 with the clutch disengaged.

Fig. 5 is a fragmentary view partially in section on line 5—5 of Fig. 3.

Fig. 6 is a fragmentary view partially in section of a modified form of my invention, the modification being mainly in the control rod.

Fig. 7 is a fragmentary end elevation looking from the right of Fig. 6.

Fig. 8 is a fragmentary view partially in section of a still further modification in the control mechanism.

It is well known that in fishing reels of the type in which the driving pinion is engaged with and disengaged from a gear connected to the spool by a bodily shifting of the pinion through an arc, the engagement of pinion and gear often results in stripping the teeth from the gear or pinion. I have eliminated this objection by providing a clutch mechanism which permits the continual meshing of the teeth of pinion and gear, the pinion being shifted along its axis into engagement with a clutch lug or jaw. By this arrangement, inasmuch as the pinion and driving gear are in continual mesh, and the clutch structure, comprising the lug or jaw and a coacting recess in the pinion, being of very substantial dimensions, the objectionable stripping of teeth is obviated.

The improved construction of my device provides for a minimum of moving parts and mountings therefor, resulting in a very compact structure. The clutch device is readily operated by means of finger pieces which extend from either end of the reel frame or from one end of the frame. Likewise, I have provided a spring detent which is efficient in its operation to retain the free spool clutch in operative or inoperative position.

The embodiment of my invention illustrated in Figs. 1 to 5 inclusive in the accompanying drawings, comprises a fishing reel having a spool 1 and a frame comprising head and tail or end members 2 and 3 connected in spaced relation by suitable pillars 4. The reel seat plate 5 is secured to the bottom pillars as is customary in reels of this type.

In this structure, the end members are made up of inner plates or disks and outer members of hard rubber or other suitable material as indicated, the head plate being recessed at 6 to receive the working parts. The head plate is provided with a bushing 7 for the spool shaft 8. The driven pinion 9 is slidably mounted on the shaft 8 and is provided with a jaw clutch member 10 coacting with the jaw clutch member 11 on the spool, these clutch members being engaged and disengaged by the axial movement of the pinion.

The pinion has an annular groove 12 receiving the inner fork of the resilient spring shifter arm 13, this shifter arm being forked at its outer end to engage an annular groove 14 in the shifting rod 15. This shifting rod is slidably supported in the bores 16 in the head and tail members 2 and 3. The shifting rod is provided at its ends with finger pieces 18 and has a pair of spaced annular recesses 19 between the frame end members, these recesses providing keepers with which the spring detent 20 coacts. This detent is mounted on one of the end members, the tail member in this instance, and bears on the control rod so that it engages the keepers for yieldingly holding the control rod in its adjusted positions.

The reel crank 21 is provided with a shaft, not illustrated, on which the driving gear 23 is mounted, the driving gear being in constant mesh with the driven gear.

Numeral 24 indicates a star drag adjusting member which, however, forms no part of this invention and therefore the drag mechanism is not illustrated herein.

From the foregoing description, the operation of the device is believed to be clear but it may be summarized as follows. In the position shown in Fig. 3, the clutch is in engagement and the spool is in direct driving connection with the crank. A thrust on the control rod toward the right releases the clutch so that the spool is free or is in what is known as free running condition. The detent 20 holds the parts in this disengaged or clutch release position. When it is desired to re-engage the spool, a push on the right-hand end of the control rod will re-engage the clutch and inasmuch as the arm 13 is of relatively thin or spring material, the parts may be shifted to engaging position and in the event the jaw clutch members do not register, the pinion or spool is free to rotate until they are brought to registering position when they are snapped into engagement by the spring arm.

In the embodiment of my invention shown in Figs. 6 and 7, the clutch control rod 15 is provided with a single finger piece 26 at one end, this projecting beyond the frame, as shown, the other end of the control rod sliding in a bore-like bearing 25 within the tail end member.

In the embodiment shown in Fig. 8, one of the pillars 4 is provided with a longitudinal bore 27 to receive the clutch control rod 29, the pillar having a recess 28 opening into the bore to permit engagement of the detent 20 with the keepers. Otherwise the parts are the same as described.

It will be apparent that my improved reel completely eliminates the stripping of gears due to quick clutching of a free spool reel, as well as providing a detent or a clutch device which is reliable in its operation to maintain the clutch in operative or inoperative position. All of the structure is exceedingly compact and will not become inoperative under the severest use.

I have illustrated and described my improvements in embodiments which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. In a fishing reel, the combination with a frame comprising end members, of a spool provided with a shaft journaled in said end members, means for driving said spool comprising a driving gear and a driven pinion mounted on said shaft for axial adjustment thereon and in meshing relation with said gear, said pinion having a peripheral groove and said spool and pinion being provided with coacting jaw clutch members, a control rod slidably mounted on said frame end members in parallel relation to said spool shaft and provided with finger pieces at its ends and with an annular groove, and a spring shifter arm forked at both ends, the fork at one end engaging said groove in said control rod and the fork at the other end engaging said groove in said pinion.

2. In a fishing reel, the combination with a frame comprising end members, of a spool provided with a shaft journaled in said end members, means for driving said spool comprising a driving gear and a driven pinion mounted on said shaft for axial adjustment thereon and in meshing relation with said gear, said pinion having a peripheral groove and said spool and pinion being provided with coacting jaw clutch members, a control rod slidably mounted on said frame in parallel relation to said spool shaft and provided with an annular groove, and a resilient spring shifter arm forked at both ends, the fork at one end engaging said groove in said control rod and the fork at the other end engaging said groove in said pinion.

3. In a fishing reel, the combination with a frame comprising end members, of a spool provided with a shaft journaled in said end members, means for driving said spool comprising a driving gear and a driven pinion mounted on said shaft for axial adjustment thereon and in meshing relation with said gear, said pinion having a peripheral groove and said spool and pinion being provided with coacting jaw clutch members, a control rod slidably mounted on said frame in parallel relation to said spool shaft and provided with an annular groove, said control rod being provided with spaced annular recess-like keepers, a spring detent on said frame bearing on said control rod to coact with said keepers for holding said control rod in its adjusted positions, and a resilient spring shifter arm forked at both ends, the fork at one end engaging said groove in said control rod and the fork at the other end engaging said groove in said pinion.

4. In a fishing reel, the combination with a frame comprising end members, of a spool provided with a shaft bearing in said end members, means for driving said spool comprising a driving gear and a driven pinion mounted on said shaft for axial adjustment thereon and in meshing relation with said gear, said spool and pinion being provided with coacting clutch members, a control rod slidably mounted on said frame end members in parallel relation to said spool shaft, said control rod being provided with spaced keepers, a spring detent on said frame coacting with said keepers for holding said control rod in its adjusted positions, and a resilient shifter arm engaging said control rod and said pinion.

5. In a fishing reel, the combination with a frame comprising end members, of a spool provided with a shaft bearing in said end members, means for driving said spool comprising a driving gear and a driven pinion mounted on said shaft for axial adjustment thereon and in meshing relation with said gear, said spool and pinion being provided with coacting clutch members, a control rod slidably mounted on said frame end members in parallel relation to said spool shaft, and a resilient shifter arm engaging said control rod and said pinion.

6. In a fishing reel, the combination with a frame, of a spool provided with a shaft journaled in said frame, means for driving said spool including a pinion mounted on said shaft for axial adjustment thereon, said pinion having a peripheral groove, said spool and pinion being provided with coacting clutch members, a control rod slidably mounted on said frame in parallel relation to said spool shaft and provided with an annular groove and with spaced keepers, a spring detent on said frame coacting with said keepers for holding said control rod in its adjusted positions, and a resilient shifter arm forked at its ends, the fork at one end engaging said groove in said control rod and the fork at the other end engaging said groove in said pinion.

7. In a fishing reel, the combination with a frame, of a spool provided with a shaft journaled in said frame, means for driving said spool including a pinion mounted on said shaft for axial adjustment thereon, said pinion having a peripheral groove, said spool and pinion being provided with coacting clutch members, a control rod slidably mounted on said frame in parallel relation to said spool shaft and provided with an annular groove, and a resilient shifter arm forked at its ends, the fork at one end engaging said groove in said control rod and the fork at the other end engaging said groove in said pinion.

8. In a fishing reel, the combination with a frame, of a spool, driving means for said spool including a clutch, a control rod slidably mounted on said frame to project at the ends thereof and provided with a finger piece at each end and with spaced keepers, a detent on said frame coacting with said keepers for holding said control rod in its adjusted positions, and operating connections from said control rod to said clutch.

9. In a fishing reel, the combination with a frame, of a spool, driving means for said spool including a clutch, a control rod slidably mounted on said frame and provided with spaced keepers, a detent on said frame coacting with said keepers for holding said control rod in its adjusted positions, and operating connections from said control rod to said clutch comprising a resilient forked arm engaging said control rod.

10. In a fishing reel, the combination with a frame, of a spool, driving means for said spool including a clutch, a control rod slidably mounted on said frame to project at the ends thereof and provided with a finger piece at each end, and operating connections from said control rod to said clutch.

11. In a reel, the combination of a spool and means for driving the same, comprising a pinion shiftable in a direction parallel to the spool axis, a resilient arm to shift the pinion into or out of operative relation, and means to hold said shifting arm in either position, comprising a control rod having reduced portions therein, and a spring member cooperating with one or another of said reduced portions.

12. In a reel, the combination of a frame comprising end members and pillars, a spool and means for driving the same, comprising a driving clutch, means to shift the clutch and means to hold said shifting means in either position, comprising a control rod having reduced portions therein, and a spring member cooperating with one or another of said reduced portions, one of said pillars being hollow at an end thereof to receive one end of said control rod, the other end of said control rod being slidable in a frame end member.

FRANK BURDICK.